US009832855B2

(12) United States Patent
Tao et al.

(10) Patent No.: US 9,832,855 B2
(45) Date of Patent: Nov. 28, 2017

(54) OPTICAL ISOLATION MODULE

(71) Applicant: ASML Netherlands B.V., Veldhoven (NL)

(72) Inventors: Yezheng Tao, San Diego, CA (US); Daniel John William Brown, San Diego, CA (US); Alexander Anthony Schafgans, San Diego, CA (US); Palash Parijat Das, Oceanside, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/970,402

(22) Filed: Dec. 15, 2015

(65) Prior Publication Data
US 2017/0099721 A1     Apr. 6, 2017

Related U.S. Application Data

(60) Provisional application No. 62/236,056, filed on Oct. 1, 2015.

(51) Int. Cl.
*H05G 2/00* (2006.01)
*H01S 3/00* (2006.01)
*H01S 3/223* (2006.01)
*H01S 3/23* (2006.01)

(52) U.S. Cl.
CPC .......... *H05G 2/008* (2013.01); *H01S 3/0064* (2013.01); *H01S 3/2391* (2013.01); *H05G 2/003* (2013.01); *H01S 3/2232* (2013.01); *H01S 3/2308* (2013.01)

(58) Field of Classification Search
None
See application file for complete search history.

(56) References Cited

U.S. PATENT DOCUMENTS

| 5,767,971 | A | 6/1998 | Kawai et al. |
| 6,084,706 | A * | 7/2000 | Tamkin .................. G02B 26/12 359/208.1 |
| 7,239,686 | B2 * | 7/2007 | Berglund ............... H05G 2/008 250/504 R |
| 8,653,437 | B2 | 2/2014 | Partlo et al. |
| 8,681,427 | B2 | 3/2014 | Bergstedt et al. |
| 8,958,705 | B2 | 2/2015 | Blanchette et al. |

(Continued)

OTHER PUBLICATIONS

Blaine R. Copenheaver, U.S. International Searching Authority, International Search Report and Written Opinion, counterpart PCT Application No. PCT/US2016/054914, dated Dec. 9, 2016, 15 pages total.

*Primary Examiner* — Michael Logie
(74) *Attorney, Agent, or Firm* — DiBerardino McGovern IP Group LLC

(57) ABSTRACT

An optical source for a photolithography tool includes a source configured to emit a first beam of light and a second beam of light, the first beam of light having a first wavelength, and the second beam of light having a second wavelength, the first and second wavelengths being different; an amplifier configured to amplify the first beam of light and the second beam of light to produce, respectively, a first amplified light beam and a second amplified light beam; and an optical isolator between the source and the amplifier, the optical isolator including: a plurality of dichroic optical elements, and an optical modulator between two of the dichroic optical elements.

24 Claims, 13 Drawing Sheets

(56) References Cited

U.S. PATENT DOCUMENTS

| | | |
|---|---|---|
| 9,129,717 B2 | 9/2015 | Lambert et al. |
| 2010/0108913 A1* | 5/2010 | Ershov .................... H01S 3/225 |
| | | 250/492.1 |
| 2010/0193710 A1* | 8/2010 | Wakabayashi ......... B82Y 20/00 |
| | | 250/504 R |
| 2013/0321926 A1* | 12/2013 | Bergstedt ............. G02B 27/145 |
| | | 359/634 |
| 2013/0322482 A1* | 12/2013 | Sandstrom ................ H01S 3/08 |
| | | 372/50.11 |
| 2013/0327963 A1 | 12/2013 | Lambert et al. |
| 2015/0208494 A1 | 7/2015 | Rafac |

* cited by examiner

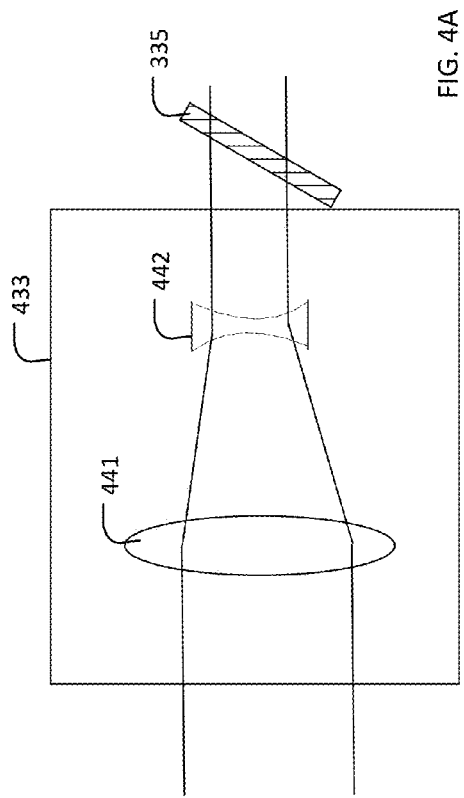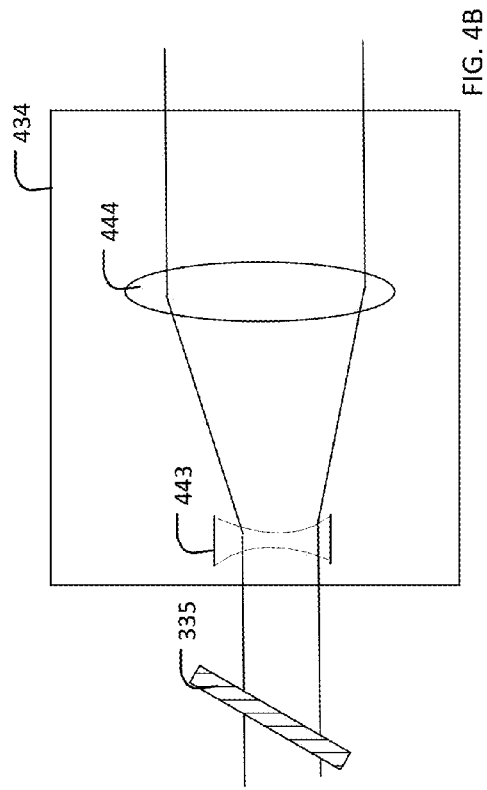

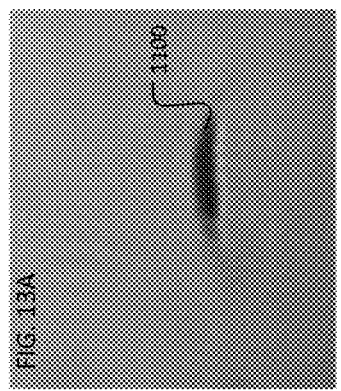
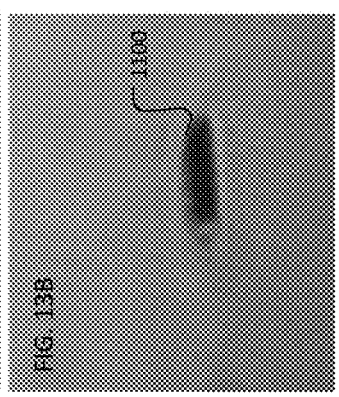
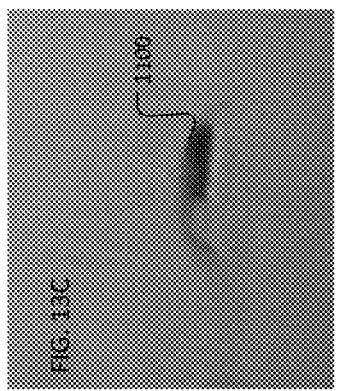
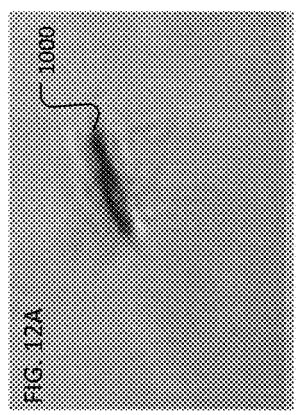
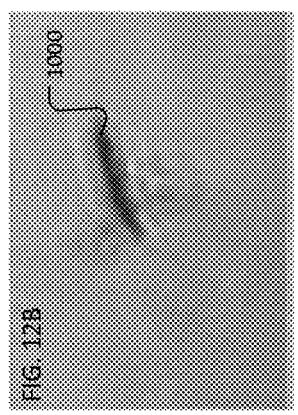
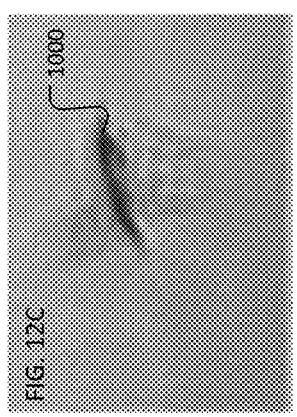

OPTICAL ISOLATION MODULE

CROSS-REFERENCE TO RELATED APPLICATION

This application claims the benefit of U.S. Provisional Application No. 62/236,056, filed on Oct. 1, 2015 and titled OPTICAL ISOLATION MODULE, which is incorporated herein by reference in its entirety.

TECHNICAL FIELD

This disclosure relates to an optical isolation module. The optical isolation module can be used in an extreme ultraviolet (EUV) light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In one general aspect, an optical source for a photolithography tool includes a source configured to emit a first beam of light and a second beam of light, the first beam of light having a first wavelength, and the second beam of light having a second wavelength, the first and second wavelengths being different; an amplifier configured to amplify the first beam of light and the second beam of light to produce, respectively, a first amplified light beam and a second amplified light beam; and an optical isolator between the source and the amplifier, the optical isolator including: a plurality of dichroic optical elements, and an optical modulator between two of the dichroic optical elements.

Implementations can include one or more of the following features. The optical modulator can include an acousto-optic modulator. Each of the dichroic optical elements can be configured to reflect light having the first wavelength and to transmit light having the second wavelength; and the acousto-optic modulator can be positioned on a beam path between two of the dichroic optical elements, the acousto-optic modulator can be positioned to receive reflected light from the two of the dichroic optical elements, the acousto-optic modulator can be configured to transmit the received light when the received light propagates in a first direction relative to the acousto-optic modulator and to deflect the received light away from the beam path when the received light propagates in a second direction relative to the acousto-optic modulator, the second direction being different from the first direction. The first and second beams of light can be pulsed beams of light. An energy of the first amplified light beam can be less than an energy of the second amplified light beam. The first amplified light beam can have an energy sufficient to deform target material in a target material droplet into a modified target, the modified target including target material in a geometric distribution that is different than a distribution of the target material in the target material droplet, the target material including material that emits extreme ultraviolet (EUV) light when in a plasma state, and the second amplified light beam has an energy sufficient to convert at least some of the target material in the modified target to the plasma that emits EUV light.

The acousto-optic modulator can be positioned on a beam path between two of the dichroic optical elements and can be positioned to receive light reflected from the two of the dichroic optical elements, the acousto-optic modulator can be configured to receive a trigger signal, and the acousto-optic modulator can be configured to deflect received light from the beam path in response to receiving the trigger signal, and to otherwise transmit received light onto the beam path.

The optical source also can include a second optical modulator between the source and the amplifier. The second optical modulator is between two of the dichroic optical elements, and the second optical modulator is on a different beam path than the optical modulator.

The source can include a laser source. The source can include a plurality of sources, the first light beam being produced by one of the sources, and the second light beam being produced by another one of the sources. The source can include one or more pre-amplifiers.

In another general aspect, an apparatus for an extreme ultraviolet (EUV) light source includes a plurality of dichroic optical elements, each of the dichroic optical elements being configured to reflect light having a wavelength in a first band of wavelengths and to transmit light having a wavelength in a second band of wavelengths; and an optical modulator positioned on a beam path between two of the dichroic optical elements, the optical modulator positioned to receive reflected light from the two dichroic optical elements, and the optical modulator configured to transmit the received light when the received light propagates in a first direction on the beam path and to deflect the received light away from the beam path when the received light propagates in a second direction on the beam path, the second direction being different from the first direction, where the first band of wavelengths includes a wavelength of a pre-pulse beam, and the second band of wavelengths includes a wavelength of a main beam.

Implementations can include one or more of the following features. The optical modulator can be an acousto-optic modulator. The apparatus also can include a control system configured to provide a trigger signal to the acousto-optic modulator, and the acousto-optic modulator can be configured to deflect light away from the beam path in response to receiving the trigger signal and otherwise transmits light onto the beam path.

The apparatus also can include a second optical modulator, where the second optical modulator is between two of the dichroic optical elements, and the second optical modulator is positioned to receive light transmitted by the two dichroic optical elements. The optical modulator and the second optical modulator can be between the same two dichroic optical elements, and the second optical modulator can be on a second beam path that is different from the beam path.

In another general aspect, a method includes reflecting a first beam of light at a first dichroic optical element, the reflected first beam of light passing through an optical modulator and an amplifier to produce an amplified first light beam; transmitting a second beam of light through the first dichroic optical element, a second dichroic optical element, and the amplifier to produce an amplified second beam; receiving a reflection of the amplified first light beam at the second dichroic optical element, wherein an interaction between the reflection of the amplified first light beam and the second dichroic optical element directing the reflected amplified first light beam to the optical modulator; and deflecting the reflection of the amplified first light beam at the optical modulator to thereby direct the reflection of the amplified first light beam away from a source of the first beam of light.

Implementations can include one or more of the following features. A trigger signal can be provided to the optical modulator after the first beam of light passes through the optical modulator and before the reflection of the amplified first light beam is at the optical modulator. The trigger signal can cause the optical modulator to be in a state in which the optical modulator deflects incident light.

The amplified first light beam can propagate toward an initial target region. The reflection of the first amplified light beam can be produced through an interaction between the first amplified light beam and a target material droplet in the initial target region. The second amplified light beam can propagate toward a target region, and an interaction between target material and the second amplified light beam can produce a reflection of the second amplified light beam, the method further including: transmitting the reflection of the second amplified light beam through the second dichroic optical element, and deflecting the reflection of the second amplified light beam at a second optical modulator to thereby direct the reflection of the second amplified light beam away from a source of the second beam of light. The source of the first beam of light and the source of the second beam of light can be the same source. The source of the first beam of light can be a first optical subsystem in the source, and the source of the second beam of light can be a second optical subsystem in the source.

Implementations of any of the techniques described above may include a method, a process, an optical isolator, a kit or pre-assembled system for retrofitting an existing EUV light source, or an apparatus. The details of one or more implementations are set forth in the accompanying drawings and the description below. Other features will be apparent from the description and drawings, and from the claims.

BRIEF DESCRIPTION OF THE DRAWINGS

FIGS. 4A and 4B are block diagrams of exemplary optical arrangements that can be used in the optical isolators of FIGS. 3 and 6.

FIGS. 9, 10A, 10B, 11A, 11B, 12A-12C, and 13A-13C are examples of experimental data collected with and without an optical isolator.

DETAILED DESCRIPTION

Figure 1:
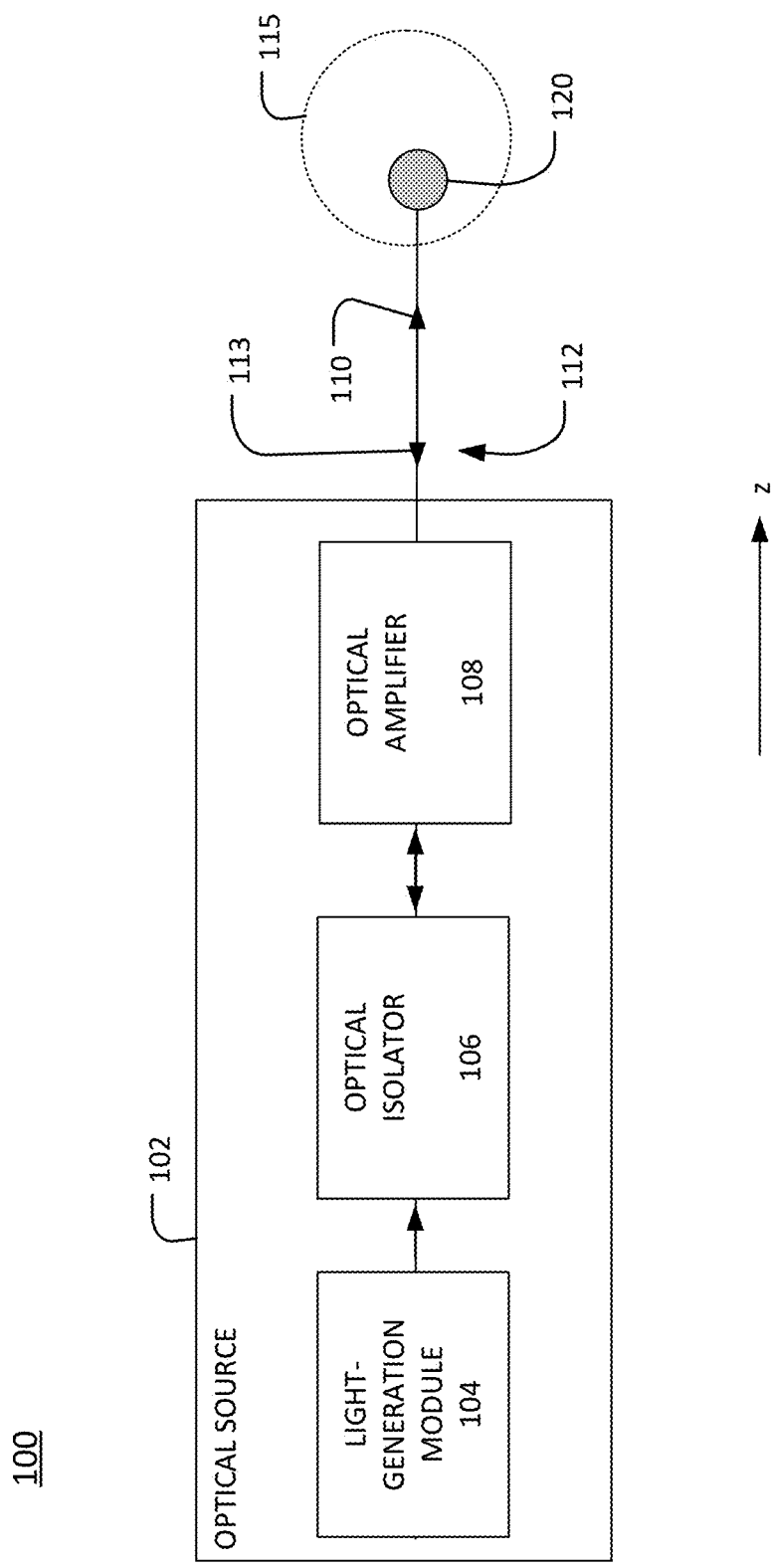
FIGS. 1 and 2 are block diagrams of exemplary optical systems.

Referring to FIG. 1, a block diagram of an exemplary optical system 100 is shown. The optical system 100 is part of an extreme ultraviolet (EUV) light source. The optical system 100 includes an optical source 102 that produces a light beam 110. The light beam 110 is emitted from the optical source 102 and propagates along a path 112 in a direction z toward a target region 115.

The target region 115 receives a target 120, which includes material that emits EUV light when converted to plasma. The target 120 is reflective at the wavelength or wavelengths of the light beam 110. Because the target 120 is reflective, when the light beam 110 interacts with the target 120, all or part of the beam 110 can be reflected along the path 112 in a direction that is different from the z direction. The reflected portion of the beam 110 is labeled as the reflection 113. The reflection 113 can travel on the path 112 in a direction that is opposite to the z direction and back into the optical source 102. Reflections of a forward-going beam (a beam that propagates from the optical source 102 toward the target region 115), such as the reflection 113, are referred to as "back reflections."

The optical source 102 includes a light-generation module 104, an optical isolator 106, and an optical amplifier 108. The light-generation module 104 is a source of light (such as one or more lasers, lamps, or any combination of such elements). The optical amplifier 108 has a gain medium (not shown), which is on the beam path 112. When the gain medium is excited, the gain medium provides photons to the light beam 110, amplifying the light beam 110 to produce the amplified light beam 110. The optical amplifier 108 can include more than one optical amplifier arranged with the respective gain mediums on the path 112. The optical amplifier 108 can be all or part of a drive laser system, such as the drive laser system 880 of FIG. 8B.

The light-generation module 104 emits the light beam 110 onto the beam path 112 toward the optical isolator 106. The optical isolator 106 passes the light beam 110 in the z direction to the optical amplifier 108 and toward the target region 115. However, the optical isolator 106 blocks the back reflection 113. Thus, and as discussed in greater detail below, the optical isolator 106 prevents the back reflection from entering the light-generation module 104. By preventing the back reflection from entering the light-generation module 104, additional optical power can be delivered to the target 120, which can lead to an increase in the amount of generated EUV light.

Figure 2:
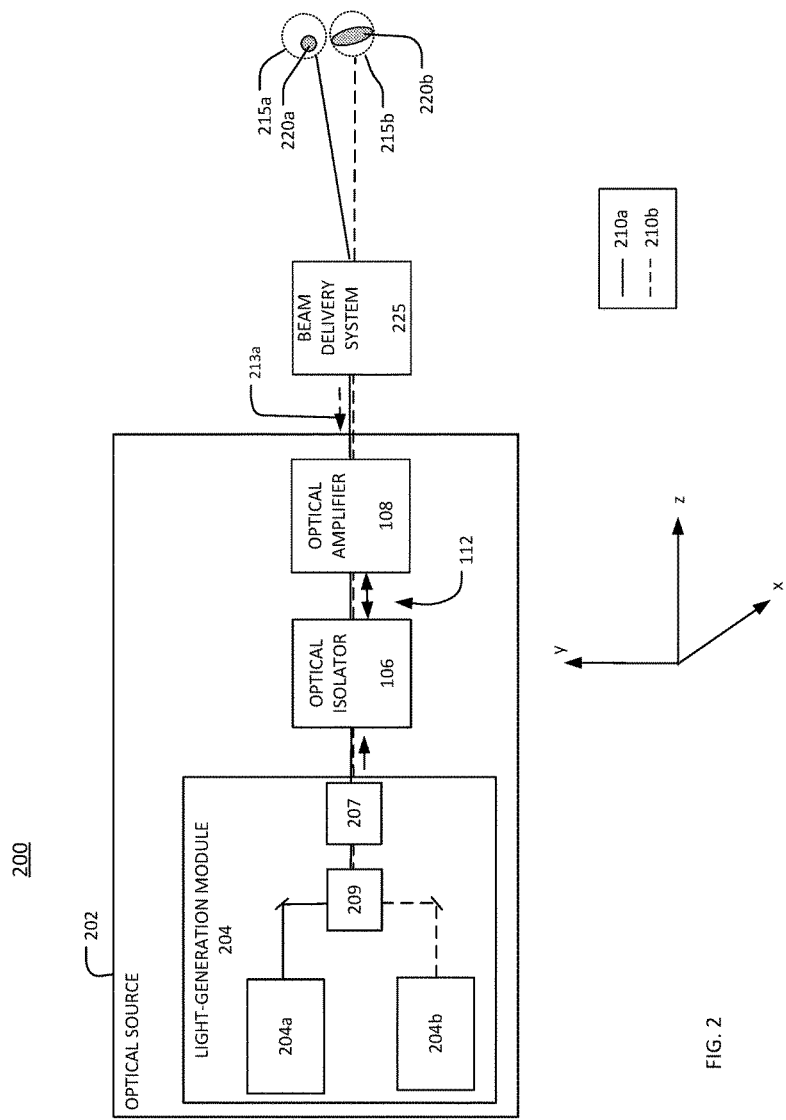

Referring to FIG. 2, a block diagram of an EUV light source 200 that includes an exemplary optical source 202 is shown. The optical source 202 can be used in place of the optical source 102 in the optical system 100 (FIG. 1). The optical source 202 includes a light-generation module 204, which includes two optical subsystems 204a, 204b, the optical amplifier 108, and the optical isolator 106. The optical isolator 106 is on the path 112 and between the optical amplifier 108 and the light-generation module 204.

The optical subsystems 204a, 204b produce first and second light beams 210a, 210b, respectively. In the example of FIG. 2, the first light beam 210a is represented by a solid line and the second light beam 210b is represented by a dashed line. The optical subsystems 204a, 204b can be, for example, two lasers. In the example of FIG. 2, the optical subsystems 204a, 204b are two carbon dioxide ($CO_2$) lasers. However, in other implementations, the optical subsystems 204a, 204b are different types of lasers. For example, the optical subsystem 204a can be a solid state laser, and the optical subsystem 204b can be a $CO_2$ laser.

The first and second light beams 210a, 210b have different wavelengths. For example, in implementations in which the optical subsystems 204a, 204b include two $CO_2$ lasers, the wavelength of the first light beam 210a can be about 10.26 micrometers (μm) and the wavelength of the second light beam 210b can be between 10.18 μm and 10.26 μm. The wavelength of the second light beam 210b can be about 10.59 μm. In these implementations, the light beams 210a, 210b are generated from different lines of the $CO_2$ laser, resulting in the light beams 210a, 210b having different wavelengths even though both beams are generated from the same type of source. The light beams 210a, 210b also can have different energies.

The light-generation module 204 also includes a beam combiner 209, which directs the first and second beams 210a, 210b onto the beam path 112. The beam combiner 209 can be any optical element or a collection of optical elements capable of directing the first and second beams 210a, 210b onto the beam path 112. For example, the beam combiner 209 can be a collection of mirrors, some of which are positioned to direct the first beam 210a onto the beam path 112 and others of which are positioned to direct the second beam 210b onto the beam path 112. The light-generation module 204 also can include a pre-amplifier 207, which amplifies the first and second beams 210a, 210b within the light-generation module 204.

The first and second beams 210a, 210b can propagate on the path 112 at different times, but the first and second beams 210a, 210b follow the path 112 and both beams 210a, 210b traverse substantially the same spatial region to the optical isolator 106, and through the optical amplifier 108. As discussed with respect to FIGS. 3 and 6, the first and second beams 210a, 210b are separated within the optical isolator 106, and then propagate on the path 112 to the optical amplifier 108.

The first and second beams 210a, 210b are angularly disbursed by a beam delivery system 225 such that the first beam 210a is directed toward an initial target region 215a, and the second beam 210b is directed toward a modified target region 215b, which is displaced in the −y direction relative to the initial target region 215a. In some implementations, the beam delivery system 225 also focuses the first and second beams 210a, 210b to locations within or near the initial and modified target regions 215a, 215b, respectively.

In the example shown in FIG. 2, the initial target region 215a receives an initial target 220a and the first beam 210a. The first beam 210a has an energy that is sufficient to modify the geometric distribution of target material in the initial target 220a (or to initiate the spatial reconfiguration of the target material) into a modified target that is received in the modified target region 215b. The second beam 210b is also received in the modified target region 215b. The second beam 210b has an energy that is sufficient to convert at least some of the target material in the modified target 220b into a plasma that emits EUV light. In this example, the first beam 210a can be referred to as a "pre-pulse", and the second beam 210b can be referred to as the "main pulse."

The first beam 210a can reflect off of the initial target 220a, giving rise to a back reflection 213a that can propagate along the path 112 in a direction other than the z direction and into the optical amplifier 108. Because the first beam 210a is used to modify a spatial characteristic of the initial target 220a and is not intended to convert the initial target 220a into the plasma that emits EUV light, the first beam 210a has a lower energy than the second beam 210b. However, reflections of the first light beam 210a can have more energy than reflections of the second light beam 201b.

The first beam 210a (and the reflection 213a) propagates through the optical amplifier 108 before the second beam 210b. Thus, the gain medium of the optical amplifier 108 can still be excited when the reflection 213a passes through the gain medium of the optical amplifier 108. As a result, the reflection 213a can be amplified by the amplifier 108. Further, the initial target 220a can be substantially spherical in shape, dense, and highly reflective, whereas the modified target 220b can be a disk-like shape (or other non-spherical shape), less dense and less reflective. Due to the non-spherical shape, the modified target 220b can be positioned to reduce the amount of light that reflects back onto the path 112 due to an interaction between the second beam 210b and the modified target 220b. For example, the modified target 220b can be tilted in the x-z and/or y-z plane relative to the direction of propagation of the light beam 210b, or the modified target 220b can be away from the focus of the second beam 210b.

In some implementations, the modified target 220b is not tilted in the x-z and/or y-z plane, and the modified target 220b is instead oriented such that the side of the modified target 220b that has the greatest spatial extent is in a plane that is perpendicular to the direction of propagation of the second beam 210b. Orienting the modified target 220b in this manner (which can be referred to as a "flat" target orientation) can enhance the absorption of the second beam 210b. In some implementations, such an orientation can increase the absorption of the second beam 210b by about 10% as compared to instances in which the modified target 220b is tilted 20 degrees (°) relative to a plane that is perpendicular to the direction of propagation of the second beam 210b. Orienting the modified target 220b in a flat orientation can increase the amount of reflected light that propagates back into the optical source 202. However, because the optical source 202 includes the optical isolator 106, the modified target 220b can have a flat orientation because the optical isolator 106 acts to reduce the impact of reflections that can arise from the modified target 220b in a flat orientation.

Finally, because the second beam 210b has a relatively large energy, the forward propagation of the second beam 210b through the amplifier 108 saturates the gain medium, leaving little energy that the amplifier 108 can provide to a back reflection of the second beam 210b. As such, even though the first beam 210a has a lower energy than the second beam 210b, the back reflection 213a, which arises from the first beam 210a, can be substantial and can be larger than a back reflection arising from the second beam 210b.

Figure 6:
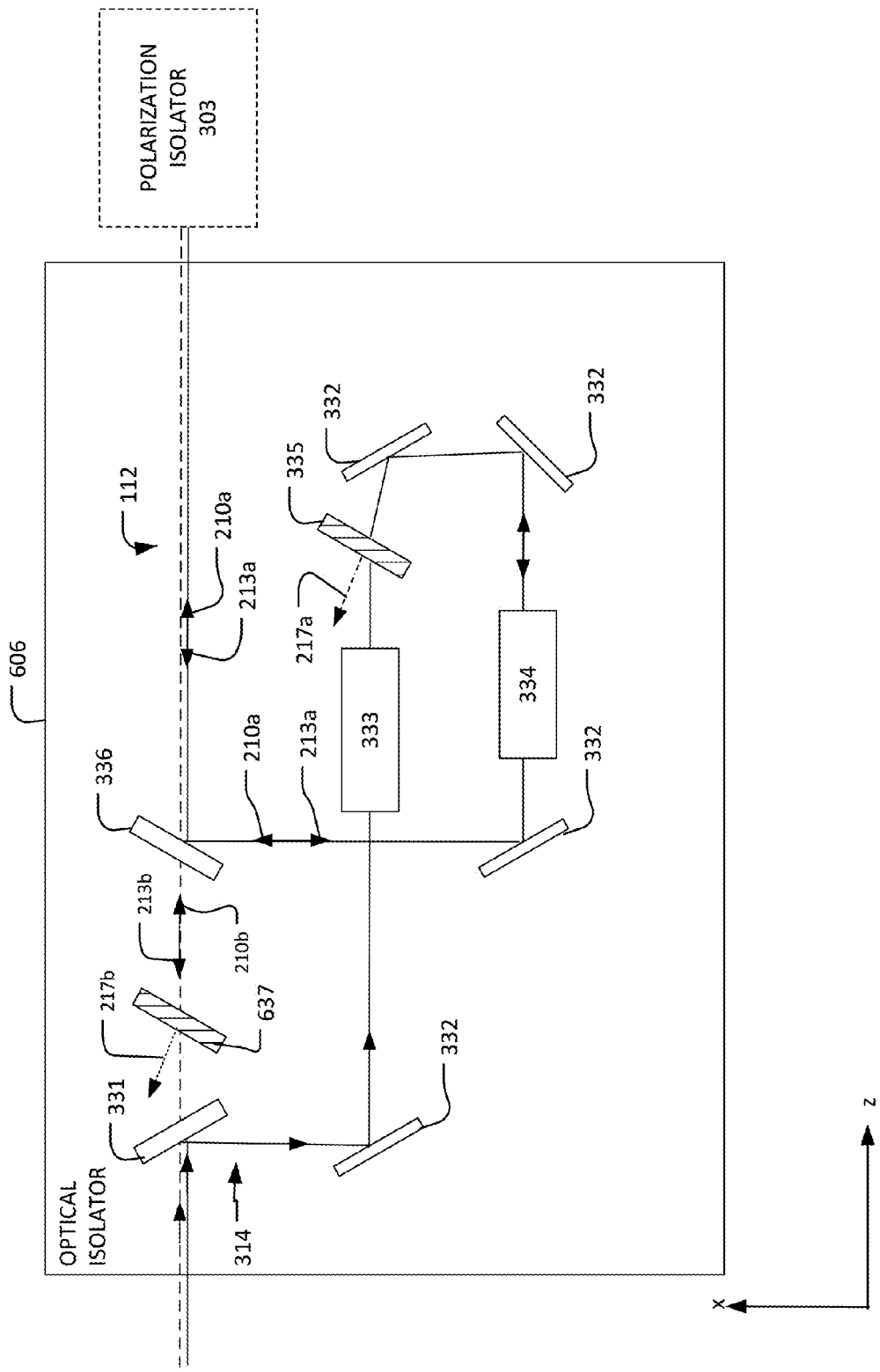

As discussed below, the optical isolator 106 prevents back reflections arising from the first beam 210a from entering the light-generation module 204. The optical isolator 106 also can prevent back reflections arising from the second beam 210b from entering the light-generation module 204, and an example of such an implementation is shown in FIG. 6. Because the optical isolator 106 prevents potentially damaging back reflections from reaching the light-generation module 204, higher energy light beams can be generated from the light-generation module 204, resulting in more energy being delivered to the modified target 220b and more EUV light. In some implementations, the average amount of EUV light produced can be increased by about 20% by using the optical isolator 106.

Figure 3:
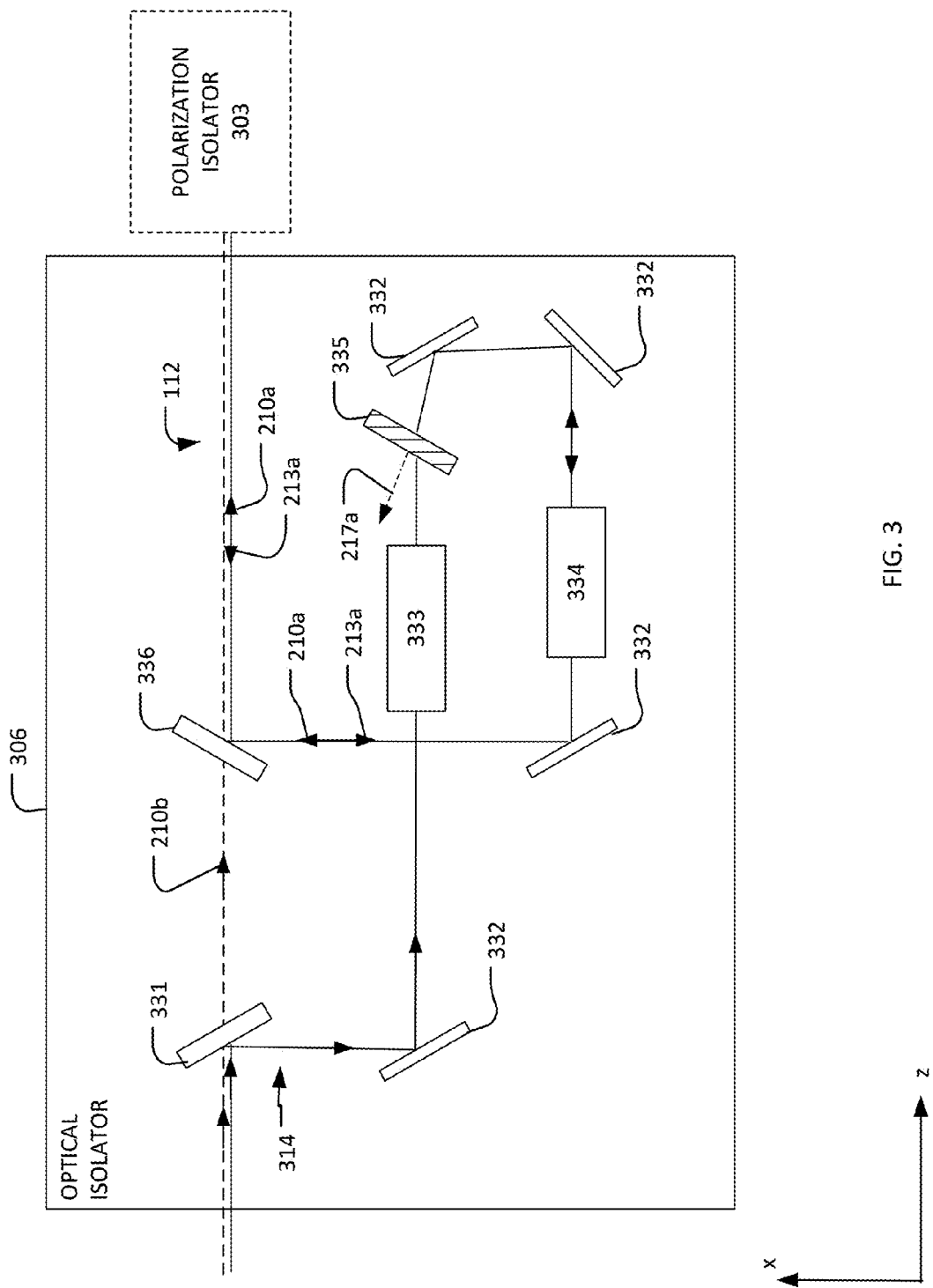
FIGS. 3 and 6 are block diagrams of exemplary optical isolators.

Referring to FIG. 3, a block diagram of an exemplary optical isolator 306 is shown. The optical isolator 306 can be used as the optical isolator 106 in the optical source 102 (FIG. 1), the optical source 202 (FIG. 2), or in any other optical source. The optical isolator 306 is discussed with respect to the optical source 202.

The optical isolator 306 includes a dichroic optical element 331, reflective elements 332, an optical modulator 335, and a dichroic element 336. The optical isolator 306 also can include optical arrangements 333, 334. The dichroic elements 331 and 336 are on the beam path 112. The dichroic elements 331 and 336 can be any optical component that is capable of separating or filtering light according to its wavelength. For example, the dichroic elements 331 and 336 can be dichroic mirrors, dichroic filters, dichroic beam splitters, or a combination of such elements. The dichroic elements 331 and 336 can be identical to each other, or they can have different configurations. In the example of FIG. 3, the dichroic elements 331 and 336 reflect the wavelength (or wavelengths) of the first beam 210a and transmit the wavelength (or wavelengths) of the second beam 210b.

The first beam 210a is reflected from the dichroic element 331 onto a beam path 314, which is between the dichroic elements 331 and 336 and has a spatial extent and form defined by the reflective elements 332. The beam path 314 is different from the beam path 112. Thus, in the optical isolator 306, the first beam 210a does not remain on the beam path 112, and the first and second beams 210a, 210b are spatially separated from each other. The first beam 210a propagates on the beam path 314 through the optical arrangements 333, 334, and the optical modulator 335, before reaching the dichroic element 336, which reflects the beam 210a back onto the beam path 112. The second beam 210b passes through the dichroic element 331 and through the dichroic element 336, remaining on the beam path 112 while propagating through the optical isolator 306.

The optical modulator 335 is on the beam path 314 between the dichroic elements 331 and 336. The optical modulator 335 is an optical element that is capable of deflecting incident light away from the path 314. The optical modulator 335 is adjustable between an open state and a closed state such that the optical modulator 335 can transmit the first beam 210a and block the reflection 213a (the reflection of the first beam 210a from the initial target 220a).

The optical modulator 335 can be, for example, an acousto-optic modulator (AOM). An acousto-optic modulator includes a medium (such as quartz or glass) connected to a transducer (such as a piezo-electric transducer). Motion of the transducer causes sound waves to form in the medium, creating a spatially varying index of refraction in the medium. When the medium includes the sound waves, light incident on the medium is deflected. When the sound waves are not present in the medium, the acousto-optic modulator transmits incident light without deflection. Other optical modulators can be used as the modulator 335. For example, the optical modulator 335 can be a Faraday rotator or an electro-optic modulator (EOM). The modulator 335 can be a combination of such devices, and can include more than one of the same type of device.

In implementations in which the optical modulator 335 is an acousto-optic modulator, the transducer moves at a time when the reflection 213a is expected to enter the path 314. At other times, the transducer is not moved or vibrated. Thus, the beam 210a (the forward-going "pre-pulse") passes through the optical modulator 335, remaining on the path 314 and ultimately rejoining the path 112. However, the reflection 213a is deflected (shown as deflection 217a in FIG. 3) away from the path 314. As a result, the reflection 213a does not reach the light-generation module 204 (FIG. 2).

Because the optical modulator 335 can be configured to transmit incident light only at certain times, the optical isolator 306 provides a time-gate based isolation technique as opposed to one that is based on polarization. Additionally, the optical isolator 306 can be used in combination with a polarization-based isolation technique. For example, the polarization of the back reflections can be different than the polarization of the forward-going beams 210a, 210b, and a polarization isolator 303, which includes a polarizing element (such as a thin film polarizer), can be placed between the optical isolator 306 and the optical amplifier 108 (FIGS. 1 and 2) to provide additional blocking of back reflections. The polarizing element of the polarization isolator 303 can be configured to primarily reject reflections of the second light beam 210b, allowing the optical isolator 306 to be tailored to reject reflections of the first light beam 210a. By using different techniques to reject reflections of the first light beam 210a and the second light beam 210b, the overall amount of reflections reaching the light-generation module 204 from any source can be reduced.

In some implementations, the optical isolator 306 includes first and second optical arrangements 333, 334. The first beam 210a passes through the first optical arrangement 333 before reaching the optical modulator 335. The first optical arrangement 333 can be any optical element or a collection of optical elements that reduces the beam diameter of the first light beam 210a. After passing through the optical modulator 335, the first beam 210a passes through the second optical arrangement 334. The second optical arrangement 334 can be any optical element or a collection of optical elements that enlarge the beam diameter of the second light beam 210b. The speed at which the optical modulator 335 can be transitioned between being opened (in a state in which incident light is transmitted by the optical modulator 335) or closed (in a state in which incident light is deflected or blocked by the optical modulator 335) increases as the beam diameter decreases. Thus, by reducing the diameter of the first beam 210a, the first optical arrangement 333 allows the optical modulator 335 to switch between being opened and closed, and vice versa, more quickly than in implementations that lack the first optical arrangement 333. In some implementations, the beam diameter of the beam 210a can be reduced to about 3 millimeters (mm).

The second optical arrangement 334 enlarges the diameter of the first light beam 210a prior to directing the first light beam 210a onto the path 112. Additionally, the second optical arrangement 334 reduces the beam diameter of the reflection 213a before the reflection 213a reaches the optical modulator 335. By reducing the beam diameter of the reflection 213a, the speed at which the optical modulator 335 must be transitioned between the open and closed states to block the reflection 213a is reduced.

Referring to FIGS. 4A and 4B, block diagrams of exemplary optical arrangements 433 and 434, respectively, are shown. The optical arrangements 433, 434 can be used as the optical arrangement 333, 334, respectively, in the optical isolator 306 (FIG. 3). The optical arrangements 433, 434 are Galilean telescopes, which have one convex lens and one concave lens. In the optical arrangement 433, a concave lens 442 is between a convex lens 441 and the optical modulator 335. In the optical arrangement 434, a concave lens 443 is between the optical modulator 335 and a convex lens 444. Both of the arrangements 433, 434 reduce the diameter of a beam that propagates toward the optical modulator 335. When the optical arrangements 433, 434 are used together in the configuration shown in FIG. 3, the beam diameter of the beam 210a is reduced prior to being incident on the optical modulator 335, and the beam diameter of the beam 210a is enlarged by the optical arrangement 434 after passing through the optical modulator 335. The beam diameter of the reflection 213a is reduced by the optical arrangement 434 prior to reaching the optical modulator 335. The reflection 213a does not pass through the optical arrangement 433 because the optical modulator 335 deflects the reflection 213a from the beam path 314.

The optical arrangements 433 and 434 can be identical Galilean telescopes or the arrangements 433 and 434 can includes lenses that have different characteristics (such as different focal lengths).

Figures 5A, 5B:
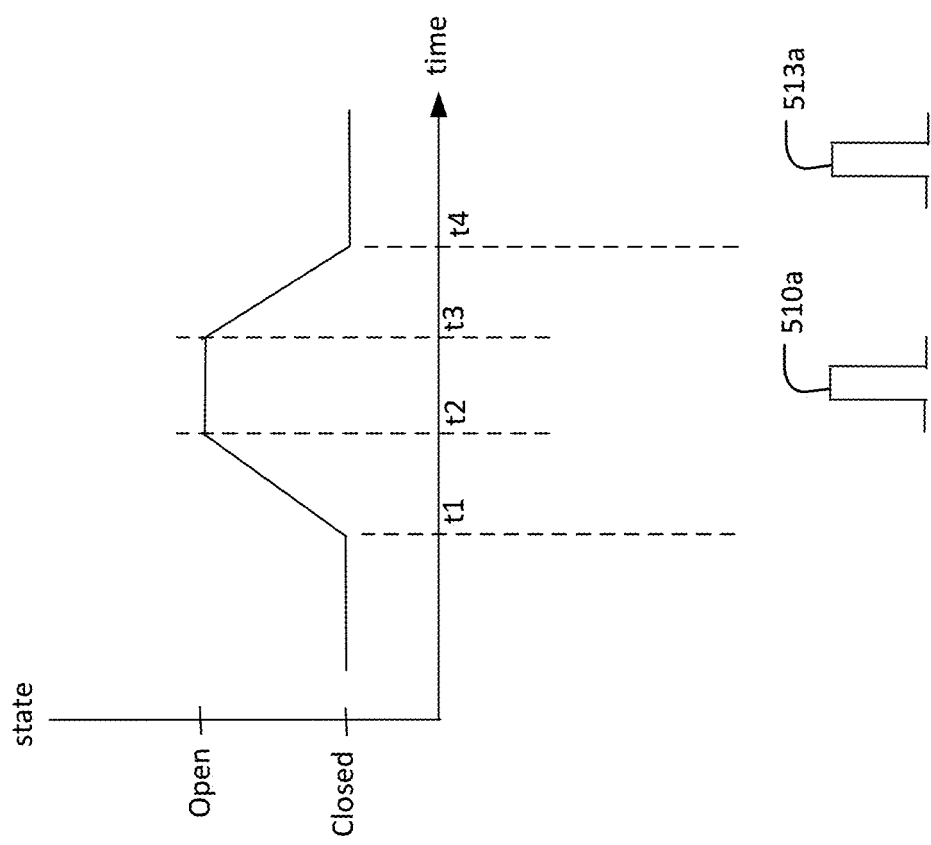
FIGS. 5A and 5B are timing plots associated with an exemplary optical modulator.

Referring to FIG. 5A, an exemplary plot that shows the state of the optical modulator 335 as a function of time is shown. FIG. 5B shows the relative placement of pulses of a beam 510a and a reflection 513a on the same time axis that is shown in FIG. 5A. The pulse 510a is a pulse of a beam that propagates through the system 200 (FIG. 2) when the system 200 is configured to use the optical isolator 306 (FIG. 3) as the optical isolator 106, and the reflection 513a is a reflection of the pulse 513a from the initial target 220a. The pulse 510a is a pulse of a pulsed light beam that is used as a "pre-pulse" to shape the initial target 220a.

The optical modulator 335 is closed (deflects light from the path 314 or otherwise prevents incident light from remaining on the path 314) from the time t1 to the time t2. At the time t2, the optical modulator 335 begins to transition to the open state. The optical modulator 335 is open between the times t2 and t3, and, during this time range, the optical modulator 335 transmits incident light. The optical modulator 335 transitions to be closed at the time t3, and becomes closed again at the time t4. As discussed above, the transition times (the time between the time t2 and t3 and the time between t3 and t4) can be reduced by reducing the beam diameter of the light that is gated by the optical modulator 335.

Referring also to FIG. 5B, the times t2 and t3 are selected such that the pulse 510a is incident on the optical modulator 335 at a time when the modulator 335 is open. Thus, the pulse 510a passes through the optical modulator 335 to reach the initial target 220a. The times t3 and t4 are selected so that the optical modulator 335 begins to close after transmitting the pulse 510a and is closed when the reflection 513a is incident on the optical modulator 335. In this way, the optical modulator 335 provides a time-gate based isolation of the pre-pulse reflection 513a.

In some implementations, the beam diameter of the pre-pulse 510a and the reflection 513a can be 3 mm. In implementations in which the optical modulator 335 is an acousto-optic modulator, the time that the optical modulator takes to transition from open to close and vice versa is determined by the beam diameter of the incident light and the speed of sound in the material of the optical modulator. The material can be, for example, germanium (Ge), which has an acoustic wave speed of 5500 meters/second (m/s). In this example, the transition time (the time for the optical modulator to transition from closed to open) is 375 nanoseconds (ns). The delay between the pre-pulse 510a and the reflection 513a can be, for example, 400 ns. Thus, the pre-pulse 510a is transmitted by the optical modulator 335 and the reflection 513a is deflected off of the path 314.

In some implementations, the optical modulator 335 is closed except for the period of time at which the pulse 510a is expected. By remaining closed at other times, the optical modulator 335 prevents the reflection 513a from entering the light-generation module 204. Additionally, by remaining closed, the modulator 335 also prevents or reduces the impact of secondary reflections of the pulse 510a. Elements, such as filters, pinholes, lenses, and tubes, on the path 112 are sources of glint and reflect incident light. These elements can reflect the pulse 510b and cause secondary reflections that propagate on the path 112 and the path 314, and these secondary reflections are in addition to the reflection 513a. By keeping the modulator 335 closed except when the pulse 510a is incident on the modulator 335, the secondary reflections are also prevented from entering the light-generation module 204. Furthermore, the secondary reflections are removed from the path 314 and are thus prevented from propagating back onto the path 112. In this way, the secondary reflections cannot reach the initial target region 215a, the modified target region 215b, or the region between the regions 215a and 215b. If the secondary reflections are able to reach these regions, the reflections can harm the target by breaking it apart before the target reaches the modified target region 215b. The secondary reflections can be referred to as forward pulse excited by reverse pulses (FERs). The optical isolator 306 can help mitigate self-lasing, which can limit the maximum about of optical power delivered to the target region 215b.

Referring to FIG. 6, a block diagram of another exemplary optical isolator 606 is shown. The optical isolator 606 can be used instead of the optical isolator 106 in the system 100 (FIG. 1) or the system 200 (FIG. 2). Additionally, the optical isolator 606 can be used in any other optical system where the prevention of back reflections is desirable. The optical isolator 606 is discussed with respect to a configuration in which the optical isolator 606 is used as the optical isolator 106 in the system 200 (FIG. 2). The optical isolator 606 can be used with the polarization isolator 303 discussed above with respect to FIG. 3. In implementations that include the polarization isolator 303, the polarization isolator 303 is between the optical isolator 606 and the optical amplifier 108 (FIGS. 1 and 2) to provide additional blocking of back reflections.

The optical isolator 606 is similar to the optical isolator 306 (FIG. 3), except the optical isolator 606 includes a second optical modulator 637. The second optical modulator 637 is on the path 112, and is positioned between the dichroic optical element 331 and the dichroic optical element 336. Similar to the optical modulator 335, the second optical modulator 637 transmits incident light when in an open state and deflects or blocks incident light when in a closed state. The second light beam 210b is emitted from the light-generation module 204 and propagates on the path 112 to the dichroic optical element 331.

As discussed above, the dichroic optical element 331 transmits the wavelength of the second light beam 210b. Thus, the second light beam 210b passes through the dichroic optical element 331 and is incident on the second optical modulator 637. The second optical modulator 637 is controlled to be in the open state when the second light beam 210b is incident on the modulator 637, and the second light beam 210b passes through the modulator 637 and the dichroic optical element 336, remaining on the path 112 and reaching the modified target region 215b (FIG. 2). Part of the second light beam 210b is reflected from the modified target 220b (in addition to converting at least some of the target material to plasma that emits EUV light) and can propagate as a reflection 213b along the path 112 in a direction other than the z direction.

The reflection 213b is transmitted by the dichroic optical element 336 and remains on the path 112. The optical modulator 637 is closed when the reflection 213b is incident on the modulator 637, and the reflection 213b is deflected from the path 112 as deflected light 217b. Thus, the second modulator 637 prevents the reflection 213b from reaching the light-generation module 204 or reduces the amount of the reflection 213b that reaches the light-generation module 204, reducing or eliminating self-lasing from the light-generation module 404 and allowing the second light beam 210b to be of greater energy. In some implementations, the optical modulator 637 deflects 30-40% of the reflection 213b. The time during which the optical modulator 637 is open can be reduced to further reduce the amount of self-lasing. For example, reducing the open time from 20 microseconds (μs) to 2 μs can reduce the self-lasing by 90%.

The second modulator 637 is closed except for the period of time at which the beam 210b is expected. By remaining closed at other times, the second modulator 637 prevents the reflection 213b from entering the light-generation module 204. Additionally, by remaining closed, the second modulator 637 also prevents or reduces the impact of secondary reflections from of the second beam 210b. Elements, such as filters, pinholes, lenses, and tubes, on the path 112 are sources of glint and reflect incident light. These elements can reflect the second beam 210b and cause secondary reflections that are in addition to the reflection 213b (which is caused by an interaction between the second beam 210b and the modified target 220b). By keeping the modulator 637 closed except when the second light beam 210b is incident on the modulator 637, the secondary reflections are also prevented from entering the light-generation module 204 and the secondary reflections are removed from the path 112.

The second optical modulator 637 can be the same as the modulator 335, or the second optical modulator 637 and the modulator 335 can be different types of modulators.

Figure 7:
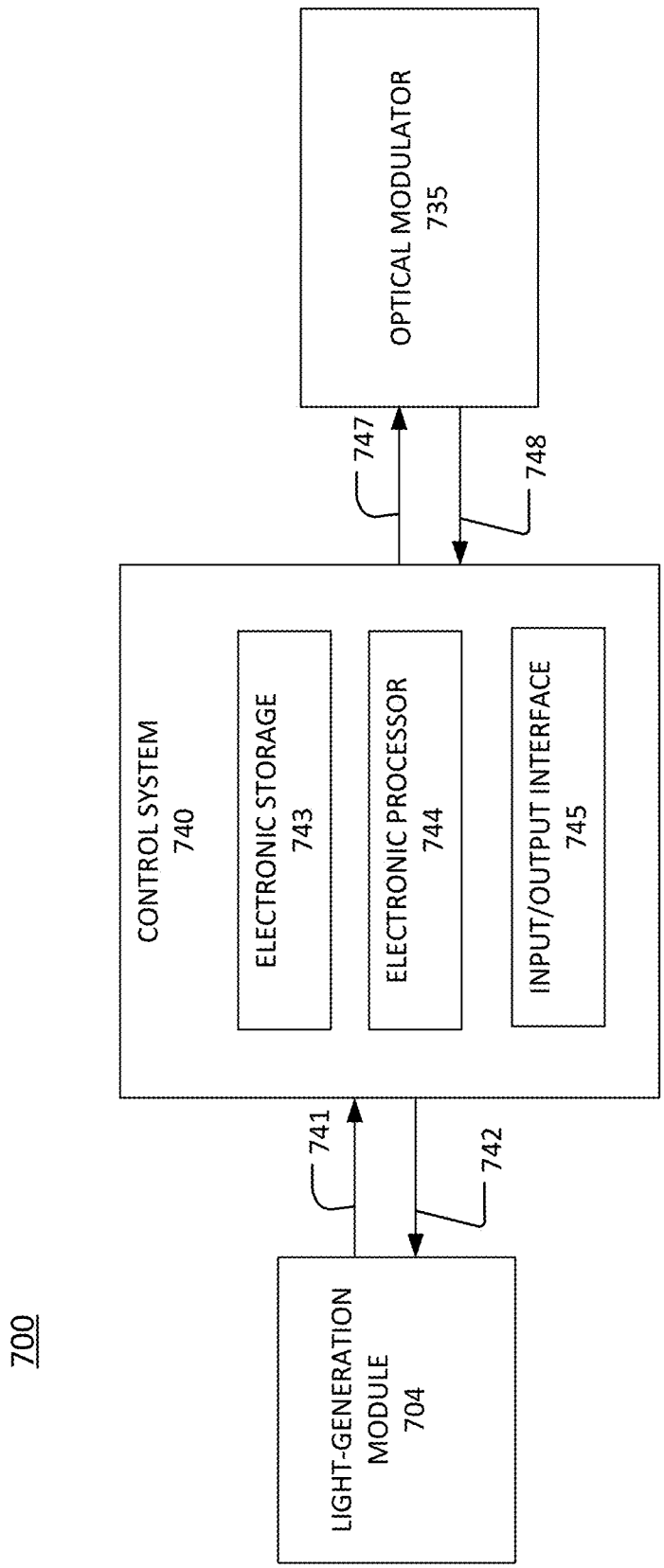
FIG. 7 is a block diagram of an exemplary control system.

Referring to FIG. 7, a block diagram of a system 700 is shown. The system 700 includes a light-generation module 704, a control system 740, and an optical modulator 735. The light-generation module 704 can be the light-generation module 104 (FIG. 1), the light-generation module 204 (FIG. 2), or any other system that generates light beams having different wavelengths. The optical modulator 735 can be the optical modulator 335 (FIG. 3) and/or the optical modulator 637 (FIG. 6).

The control system 740 provides a trigger signal 747 to the optical modulator 735. The trigger signal 747 is sufficient to cause the optical modulator 735 to change state or to begin to change state. For example, in implementations in which the optical modulator 735 is an acousto-optic modulator, the trigger signal 747 can cause the modulator to transition to a closed state by causing a transducer to vibrate to form sound waves in the modulator. The control system 740 also can receive data from the light-generation module 704 through a signal 741, and can provide data to the light-generation module 704 through a signal 742. Further, the control system 740 also can receive data from the optical module 735 via a signal 742.

The control system 740 includes an electronic storage 743, an electronic processor 744, and an input/output (I/O) interface 745. The electronic processor 744 includes one or more processors suitable for the execution of a computer program such as a general or special purpose microprocessor, and any one or more processors of any kind of digital computer. Generally, a processor receives instructions and data from a read-only memory or a random access memory or both. The electronic processor 744 can be any type of electronic processor.

The electronic storage 743 can be volatile memory, such as RAM, or non-volatile memory. In some implementations, and the electronic storage 743 can include both non-volatile and volatile portions or components. The electronic storage 743 can data and information that is used in the operation of the optical modulator 735. For example, the electronic storage 743 can store timing information that specifies when the first and second beams 210a, 210b are expected to propagate through the system 200 (FIG. 2). The electronic storage 743 also can store instructions, perhaps as a computer program, that, when executed, cause the processor 744 to communicate with other components in the control system 740, the light-generation module 704, and/or the optical modulator 735. For example, the instructions can be instructions that cause the electronic processor 744 to provide a trigger signal 747 to the optical modulator 735 at certain times that are specified by the timing information stored on the electronic storage 743.

The I/O interface 745 is any kind of electronic interface that allows the control system 740 to receive and/or provide data and signals with an operator, the light-generation module 704, the optical modulator 735, and/or an automated process running on another electronic device. For example, the I/O interface 745 can include one or more of a visual display, a keyboard, or a communications interface.

Figure 8A:
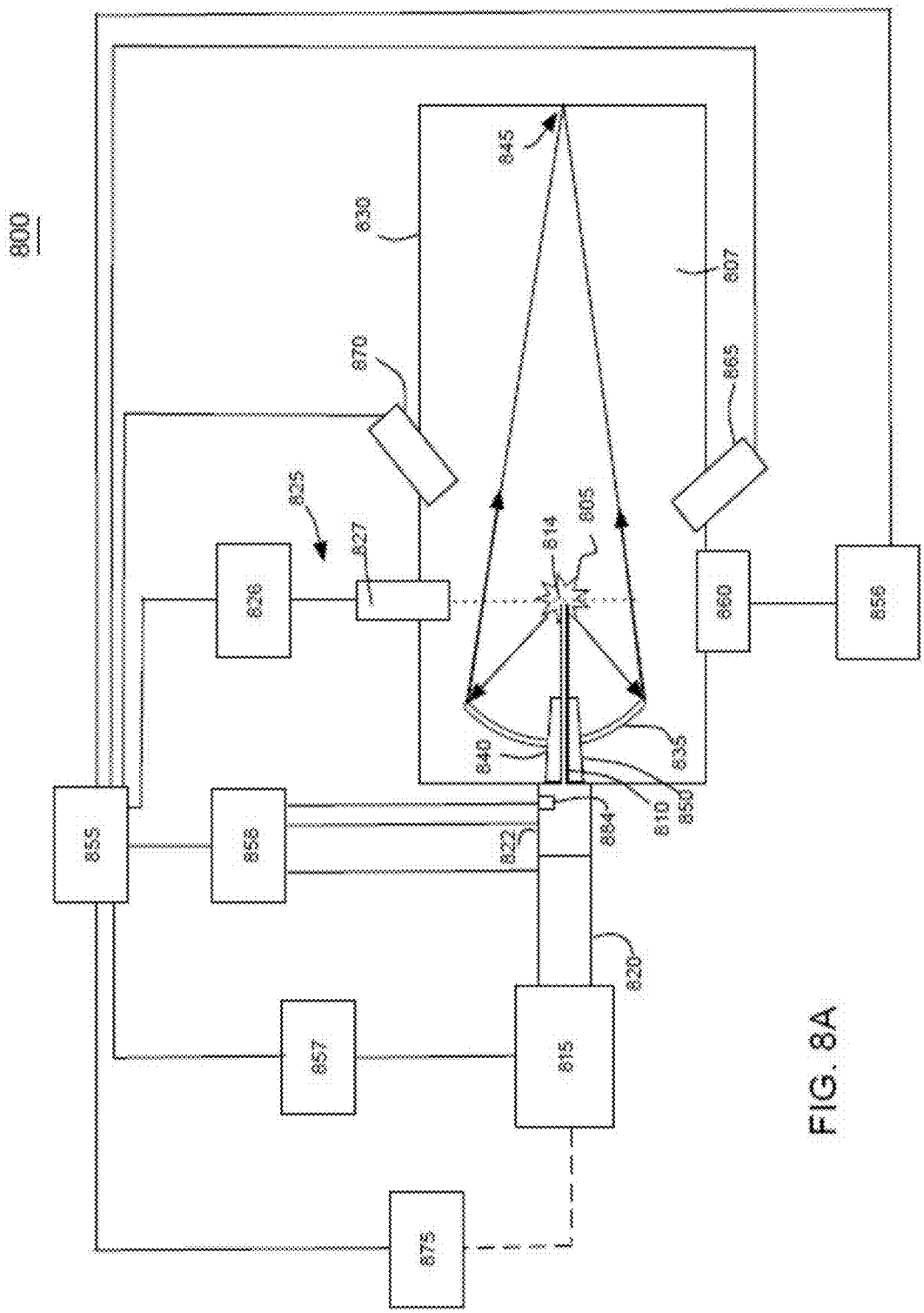
FIGS. 8A and 8B are a block diagram of a drive laser system for an extreme ultraviolet (EUV) light source.

Referring to FIG. 8A, an LPP EUV light source 800 is shown. The optical systems 100 and 200 can be part of an EUV light source, such as the source 800. The LPP EUV light source 800 is formed by irradiating a target mixture 814 at a target location 805 with an amplified light beam 810 that travels along a beam path toward the target mixture 814. The target location 805, which is also referred to as the irradiation site, is within an interior 807 of a vacuum chamber 830. When the amplified light beam 810 strikes the target mixture 814, a target material within the target mixture 814 is converted into a plasma state that has an element with an emission line in the EUV range. The created plasma has certain characteristics that depend on the composition of the target material within the target mixture 814. These characteristics can include the wavelength of the EUV light produced by the plasma and the type and amount of debris released from the plasma.

The light source 800 also includes a target material delivery system 825 that delivers, controls, and directs the target mixture 814 in the form of liquid droplets, a liquid stream, solid particles or clusters, solid particles contained within liquid droplets or solid particles contained within a liquid stream. The target mixture 814 includes the target material such as, for example, water, tin, lithium, xenon, or any material that, when converted to a plasma state, has an emission line in the EUV range. For example, the element tin can be used as pure tin (Sn); as a tin compound, for example, $SnBr_4$, $SnBr_2$, $SnH_4$; as a tin alloy, for example, tin-gallium alloys, tin-indium alloys, tin-indium-gallium alloys, or any combination of these alloys. The target mixture 814 can also include impurities such as non-target particles. Thus, in the situation in which there are no impurities, the target mixture 814 is made up of only the target material. The target mixture 814 is delivered by the target material delivery system 825 into the interior 607 of the chamber 630 and to the target location 605.

The light source 800 includes a drive laser system 815 that produces the amplified light beam 810 due to a population inversion within the gain medium or mediums of the laser system 815. The light source 800 includes a beam delivery system between the laser system 815 and the target location 805, the beam delivery system including a beam transport system 820 and a focus assembly 822. The beam transport system 820 receives the amplified light beam 810 from the laser system 815, and steers and modifies the amplified light beam 810 as needed and outputs the amplified light beam 810 to the focus assembly 822. The focus assembly 822 receives the amplified light beam 810 and focuses the beam 810 to the target location 805.

In some implementations, the laser system 815 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 815 produces an amplified light beam 810 due to the population inversion in the gain media of the laser amplifiers even if there is no laser cavity. Moreover, the laser system 815 can produce an amplified light beam 810 that is a coherent laser beam if there is a laser cavity to provide enough feedback to the laser system 815. The term "amplified light beam" encompasses one or more of: light from the laser system 815 that is merely amplified but not necessarily a coherent laser oscillation and light from the laser system 815 that is amplified and is also a coherent laser oscillation.

The optical amplifiers in the laser system 815 can include as a gain medium a filling gas that includes $CO_2$ and can amplify light at a wavelength of between about 9100 and about 11000 nm, and in particular, at about 10600 nm, at a gain greater than or equal to 800. Suitable amplifiers and lasers for use in the laser system 815 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 40 kHz or more. The optical amplifiers in the laser system 815 can also include a cooling system such as water that can be used when operating the laser system 815 at higher powers.

Figure 8B:
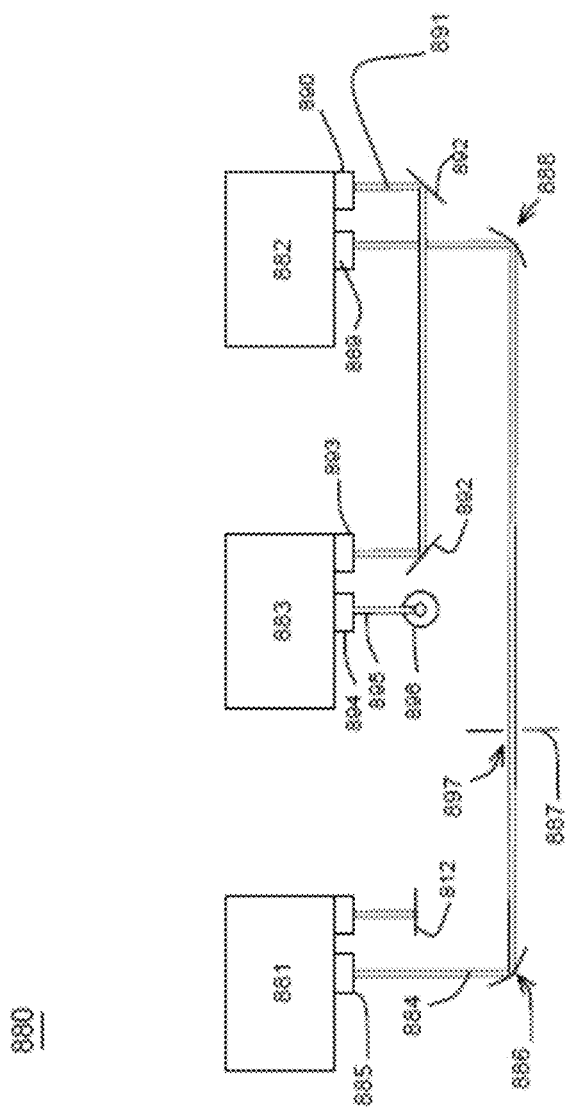

FIG. 8B shows a block diagram of an example drive laser system 880. The drive laser system 880 can be used as part of the drive laser system 815 in the source 800. The drive laser system 880 includes three power amplifiers 881, 882, and 883. Any or all of the power amplifiers 881, 882, and 883 can include internal optical elements (not shown).

Light 884 exits from the power amplifier 881 through an output window 885 and is reflected off a curved mirror 886. After reflection, the light 884 passes through a spatial filter 887, is reflected off of a curved mirror 888, and enters the power amplifier 882 through an input window 889. The light 884 is amplified in the power amplifier 882 and redirected out of the power amplifier 882 through an output window 890 as light 891. The light 891 is directed toward the amplifier 883 with a fold mirror 892 and enters the amplifier 883 through an input window 893. The amplifier 883 amplifies the light 891 and directs the light 891 out of the amplifier 883 through an output window 894 as an output beam 895. A fold mirror 896 directs the output beam 895 upward (out of the page) and toward the beam transport system 820 (FIG. 8A).

Referring again to FIG. 8B, the spatial filter 887 defines an aperture 897, which can be, for example, a circle having a diameter between about 2.2 mm and 3 mm. The curved mirrors 886 and 888 can be, for example, off-axis parabola mirrors with focal lengths of about 1.7 m and 2.3 m, respectively. The spatial filter 887 can be positioned such that the aperture 897 coincides with a focal point of the drive laser system 880.

Referring again to FIG. 8A, the light source 800 includes a collector mirror 835 having an aperture 840 to allow the amplified light beam 810 to pass through and reach the target location 805. The collector mirror 835 can be, for example, an ellipsoidal mirror that has a primary focus at the target location 805 and a secondary focus at an intermediate location 845 (also called an intermediate focus) where the EUV light can be output from the light source 800 and can be input to, for example, an integrated circuit lithography tool (not shown). The light source 800 can also include an open-ended, hollow conical shroud 850 (for example, a gas cone) that tapers toward the target location 805 from the collector mirror 835 to reduce the amount of plasma-generated debris that enters the focus assembly 822 and/or the beam transport system 820 while allowing the amplified light beam 810 to reach the target location 805. For this purpose, a gas flow can be provided in the shroud that is directed toward the target location 805.

The light source 800 can also include a master controller 855 that is connected to a droplet position detection feedback system 856, a laser control system 857, and a beam control system 858. The light source 800 can include one or more target or droplet imagers 860 that provide an output indicative of the position of a droplet, for example, relative to the target location 805 and provide this output to the droplet position detection feedback system 856, which can, for example, compute a droplet position and trajectory from which a droplet position error can be computed either on a droplet by droplet basis or on average. The droplet position detection feedback system 856 thus provides the droplet position error as an input to the master controller 855. The master controller 855 can therefore provide a laser position, direction, and timing correction signal, for example, to the laser control system 857 that can be used, for example, to control the laser timing circuit and/or to the beam control system 858 to control an amplified light beam position and shaping of the beam transport system 820 to change the location and/or focal power of the beam focal spot within the chamber 830.

The target material delivery system 825 includes a target material delivery control system 826 that is operable, in response to a signal from the master controller 855, for example, to modify the release point of the droplets as released by a target material supply apparatus 827 to correct for errors in the droplets arriving at the desired target location 805.

Additionally, the light source 800 can include light source detectors 865 and 870 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 865 generates a feedback signal for use by the master controller 855. The feedback signal can be, for example, indicative of the errors in parameters such as the timing and focus of the laser pulses to properly intercept the droplets in the right place and time for effective and efficient EUV light production.

The light source 800 can also include a guide laser 875 that can be used to align various sections of the light source 800 or to assist in steering the amplified light beam 810 to the target location 805. In connection with the guide laser 875, the light source 800 includes a metrology system 824 that is placed within the focus assembly 822 to sample a portion of light from the guide laser 875 and the amplified light beam 810. In other implementations, the metrology system 824 is placed within the beam transport system 820. The metrology system 824 can include an optical element that samples or re-directs a subset of the light, such optical element being made out of any material that can withstand the powers of the guide laser beam and the amplified light beam 810. A beam analysis system is formed from the metrology system 824 and the master controller 855 since the master controller 855 analyzes the sampled light from the guide laser 875 and uses this information to adjust components within the focus assembly 822 through the beam control system 858.

Thus, in summary, the light source 800 produces an amplified light beam 810 that is directed along the beam path to irradiate the target mixture 814 at the target location 805 to convert the target material within the mixture 814 into plasma that emits light in the EUV range. The amplified light beam 810 operates at a particular wavelength (that is also referred to as a drive laser wavelength) that is determined based on the design and properties of the laser system 815. Additionally, the amplified light beam 810 can be a laser beam when the target material provides enough feedback back into the laser system 815 to produce coherent laser light or if the drive laser system 815 includes suitable optical feedback to form a laser cavity.

Figure 9:
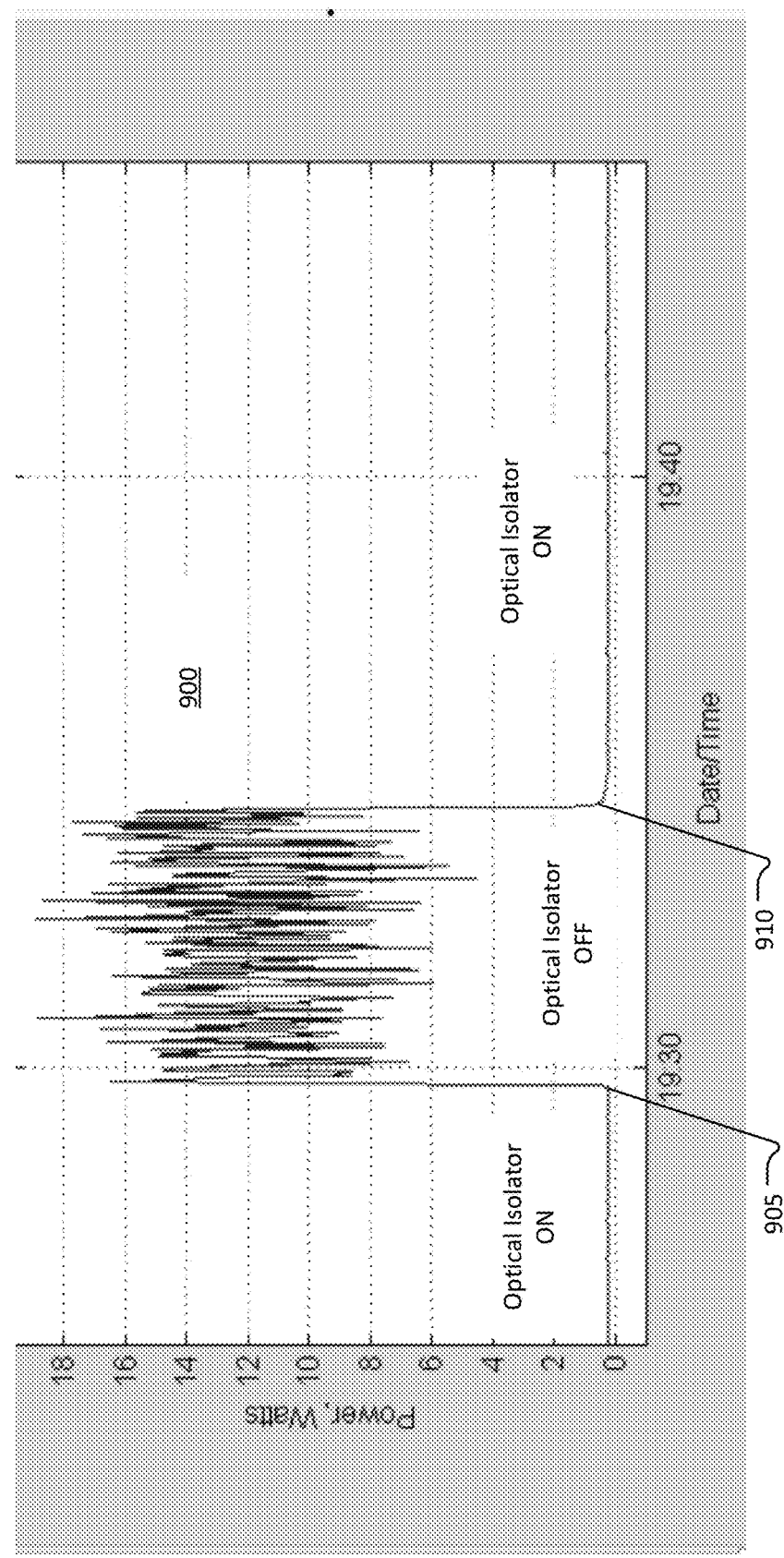

Referring to FIG. 9, a plot 900 of example test data for an optical isolator such as the optical isolator 306 (FIG. 3) is shown. The plot 900 shows the measured power of a reverse-going pre-pulse beam as a function of time with the optical isolator in an ON state and in an OFF state. The reverse-going pre-pulse beam can be a beam such as the reflection 213a (FIG. 2), which arises from the interaction between the first beam 210a (FIG. 2) and the initial target 220a (FIG. 2) as discussed above. In the ON state, the optical isolator blocks or reduces the effects of the reflection 213a by deflecting all or part of the reflection 213a from the beam path 314 so that the reflection 213a that reaches the light-generation module 204 is reduced or eliminated. In the ON state, the optical isolator can operate, for example, as discussed with respect to FIGS. 5A and 5B. In the OFF state, the optical isolator is not active and the system operates as if the optical isolator is not present.

In the example of FIG. 9, the optical isolator is in the OFF state between the times 905 and 910, and otherwise is in the ON state. When the optical isolator is in the ON state, the power of the reflection 213a that reaches the light-generation module 204 is very low, and is close to zero Watts (W). For example, the power of the reflection 213a that reaches the light-generation module 204 can be about or below 0.1 W. As discussed above, it is desirable to reduce the power of the reflection 213a that reaches the light-generation module 204. In contrast, when the optical isolator is in the OFF state, the power of the reflection 213a that reaches the light-generation module 204 is greater than 0 and can be between about 4.2 W and 18.2 W. Furthermore, when the optical isolator is in the OFF state, the power of the reflection 213a that reaches the light-generation module 204 varies quite a bit, which can lead to instabilities in the system. Thus, in addition to reducing the amount of power in the reflection 213a, the optical isolator also reduces the variation of the power of the reflection, resulting in a more stable system.

Figure 10A:
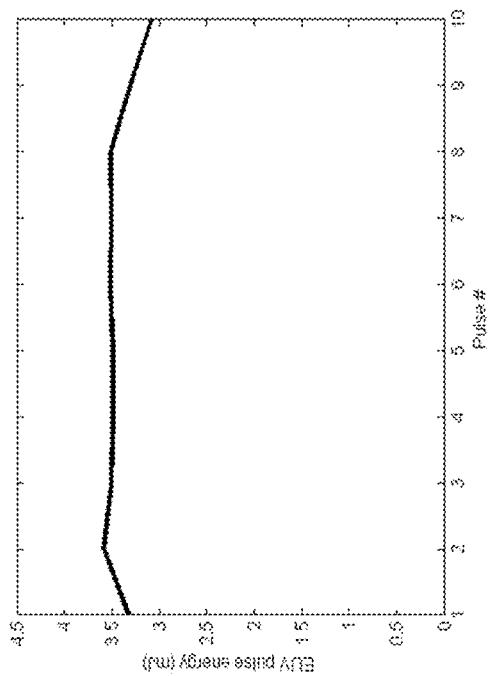
Figure 10B:
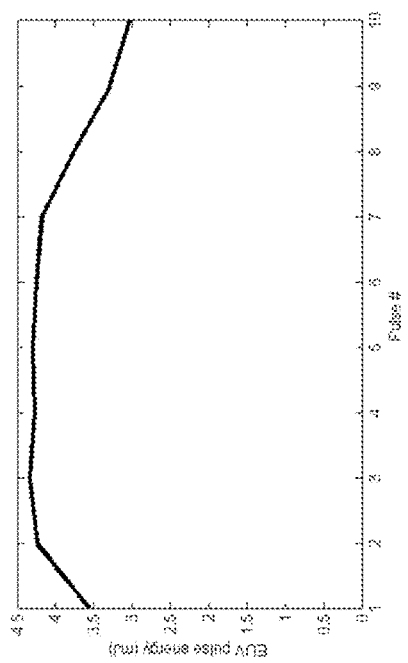

Referring to FIGS. 10A and 10B, additional example test data are shown. FIG. 10A shows the energy of the produced EUV light as a function of pulse number when the optical isolator (such as the optical isolator 306) is not present in the system, and FIG. 10B shows the energy of the produced EUV light as a function of pulse number when the optical isolator is present in the system. When the optical isolator is not present, the average energy of the EUV light is 3.4 milliJoules (mJ). When the optical isolator is present, the average EUV energy increases to 4.1 mJ.

Figure 11B:
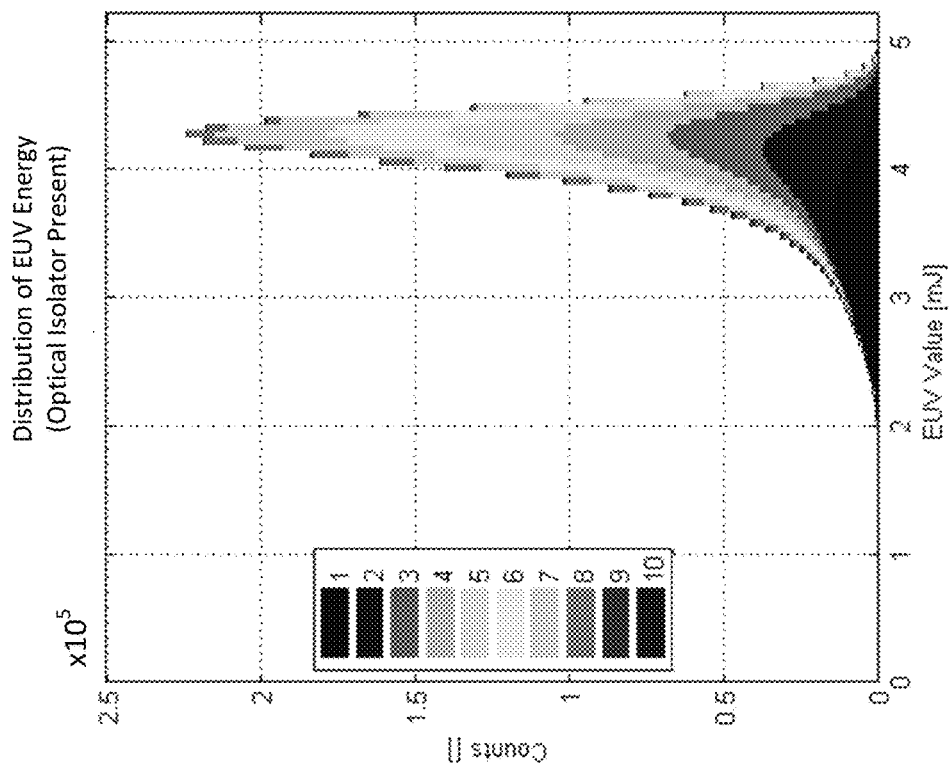
Figure 11A:
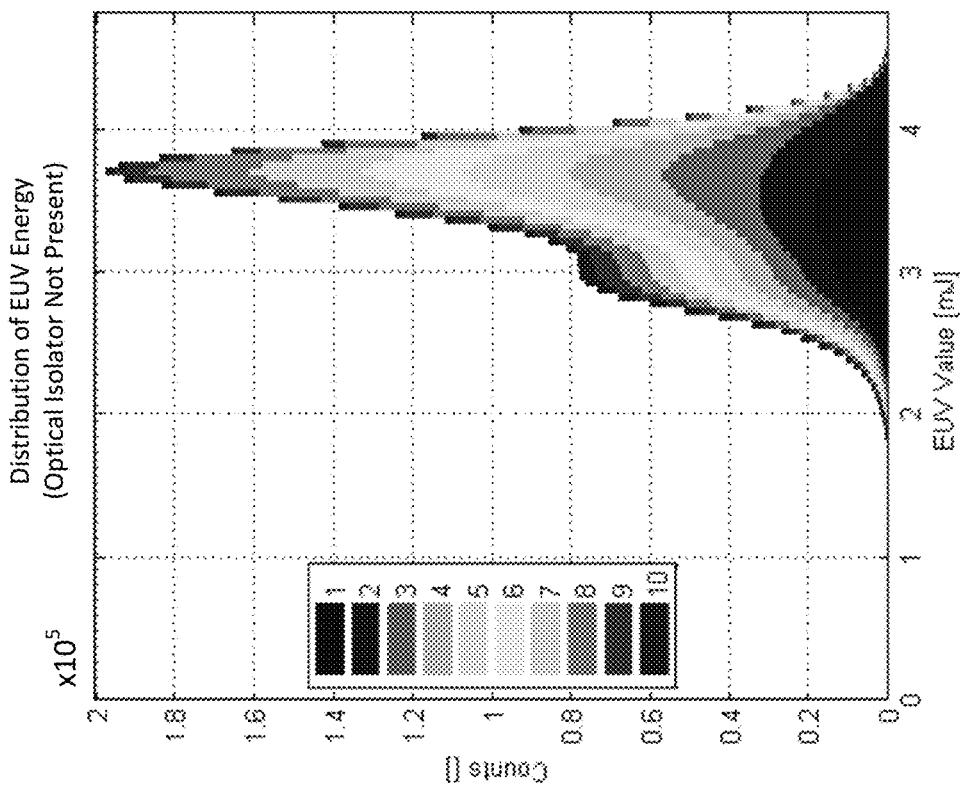

Referring also to FIGS. 11A and 11B, the produced EUV light is also more stable when the optical isolator is present in the system. FIG. 11A shows a distribution of particular values of the energy of the produced EUV light when the optical isolator is not present, and FIG. 11B shows the distribution of particular values of the energy of the produced EUV light when the optical isolator is present. The distribution of energy values of FIG. 11B (when the optical isolator is used) shows that higher energy values occur more often and that all of the energy values are contained in a smaller range as compared to a system that does not employ the optical isolator. Thus, using an optical isolator (such as the optical isolator 306) results in EUV light of higher energy and also results in EUV light that is more stable (varies less).

Referring to FIGS. 12A-12C and 13A-13C, additional example test data are shown. FIGS. 12A-12C show a target 1200 at three times in a system that lacks an optical isolator such as the optical isolator 306, and FIGS. 13A-13C show a target 1300 at three times in a system that includes an optical isolator such as the optical isolator 306. The targets 1200 and 1300 include the target material that emits EUV light when in a plasma state. The targets 1200 and 1300 are shown at times that coincide with the targets 1200 and 1300 being in a location that receives a pre-pulse (such as the initial target region 215a of FIG. 2) and a location that receives a main pulse (such as the modified target region 215b of FIG. 2).

As discussed above with respect to FIGS. 5A and 5B, the optical isolator can reduce or eliminate secondary reflections from objects such as pin holes, lenses, tubes, and optical elements. When present, the secondary reflections can reach the target as it moves from the initial target region 215a to the modified target region 215b. FIGS. 12A-12C show an example of the secondary reflections interacting with the target 1200 over time. As shown in FIGS. 12B and 12C as compared to 12A, the target 1200 spreads out spatially as time passes and breaks apart. FIGS. 13A-13C show an example of a system that uses the optical isolator (such as the optical isolator 306) to reduce or eliminate the secondary reflections. As compared to the target 1200 (FIGS. 12A-12C), the target 1300 (FIGS. 13A-13C) has a cleaner spatial profile, which can lead to increased absorption of an incident light beam and more target material available for interaction with the second beam 210b (and thus more EUV light produced). Additionally, because the target 1300 is used with an optical source that includes the optical isolator, the target 1300 can have a flat orientation relative to the direction of propagation of the incident light beam while still reducing or eliminating the effects of back reflections and secondary reflections on the optical source.

Other implementations are within the scope of the claims.

In implementations in which the optical subsystems 204a, 204b (FIG. 2) are different types of optical subsystems, the optical subsystem 204a can be a rare-earth-doped solid state laser (such as a Nd:YAG or an erbium-doped fiber (Er: glass)), and the wavelength of the first light beam 210a can be 1.06 µm. The optical subsystem 204b can be a $CO_2$ laser, and the wavelength of the light beam 210b can be, for example, 10.26 µm. In these implementations, the first and second beams 210a, 210b can be amplified in separate optical amplifiers and can follow separate paths through the system 200. Also, two separate optical isolators can be used, one for the first light beam 210a and its corresponding reflections, and another for the light beam 210b and its corresponding reflections.

The pre-amplifier 207 (FIG. 2) can have multiple stages. In other words, the pre-amplifier 207 can include more than one amplifier in series and placed on the path 112.

The light beams 110, 210a, and 210b can be pulsed light beams. The power of a pulse of the first light beam 210a (or the pulse 510a) can be, for example, 20-40 Watts (W). The power of a pulse of the second light beam 210b can be, for example, 300-500 W.

The first beam of light 210a can be any type of radiation that can act on the initial target 220a to form the modified target 220b. For example, the first beam of light 210 can be a pulsed optical beam generated by a laser. The first beam of light 210 can have a wavelength of about 1-10.6 µm. The duration of a pulse of the first beam of light 210a can be, for example, 20-70 nanoseconds (ns), less than 1 ns, 300 picoseconds (ps), between 100-300 ps, between 10-50 ps, or between 10-100 ps. The energy of a pulse of the first beam of light 210a can be, for example, 15-60 milliJoules (mJ). When the pulse of the first beam of light 210a has a duration of 1 ns or less, the energy of the pulse can be 2 mJ. The time between a pulse of the first light beam 210a and a pulse of the second light beam 210b can be, for example, 1-3 microseconds (µs).

The initial target 220a and the target 115 can have any the characteristics of the target mixture 814. For example, the initial target 220a and the target 115 can include tin.

The optical systems 100 and 200 can include the polarization isolator 303. In these implementations of the optical system 100, the polarization isolator 303 is between the optical isolator 106 and the optical amplifier 108.

What is claimed is:

1. An extreme ultraviolet (EUV) optical source comprising:
   a light-generation module comprising a first optical source configured to emit a first beam of light, and a second optical source configured to emit a second beam of light, the first beam of light having a first wavelength, and the second beam of light having a second wavelength, the first and second wavelengths being different;
   an optical amplifier comprising a gain medium, the gain medium of the optical amplifier configured to amplify the first beam of light and the second beam of light to produce, respectively, a first amplified light beam and a second amplified light beam, wherein the first amplified light beam has an energy sufficient to deform target material in a target material droplet into a modified target, the modified target comprising target material in a geometric distribution that is different than a distribution of the target material in the target material droplet, the target material comprising material that emits EUV light when in a plasma state, and the second amplified light beam has an energy sufficient to convert at least some of the target material in the modified target to the plasma that emits EUV light; and
   an optical isolator between the light-generation module and the optical amplifier, the optical isolator comprising:
      a plurality of dichroic optical elements, the plurality of dichroic optical elements comprising a first dichroic optical element positioned to receive the first light beam and the second light beam from the light-generation module, and a second dichroic optical element positioned to direct the first light beam and the second light beam toward the optical amplifier,
      a plurality of optical elements on a first beam path between the first dichroic optical element and the second dichroic optical element, the optical elements positioned to interact with light reflected from one or more of the first dichroic optical element and the second dichroic optical element, and
      an optical modulator on the first beam path between the first dichroic optical element and the second dichroic optical element.

2. The optical source of claim 1, wherein the optical modulator comprises an acousto-optic modulator.

3. The optical source of claim 2, wherein
   the acousto-optic modulator is configured to receive a trigger signal, and
   the acousto-optic modulator deflects received light from the first beam path in response to receiving the trigger signal, and otherwise transmits received light onto the first beam path.

4. The optical source of claim 1, wherein the first beam of light is a pulsed beam of light, and the second beam of light is a pulsed beam of light.

5. The optical source of claim 4, wherein an energy of the first amplified light beam is less than an energy of the second amplified light beam.

6. The optical source of claim 1, wherein the optical isolator further comprises a second optical modulator between the light-generation module and the optical amplifier.

7. The optical source of claim 6, wherein the second optical modulator is between the first and second dichroic optical elements, and the second optical modulator is on a second beam path, the second beam path being different than the first beam path.

8. The optical source of claim 1, wherein the light-generation module comprises a plurality of different kinds of lasers, the first light beam being produced by one of the types of lasers, and the second light beam being produced by another one of the types of lasers.

9. The optical source of claim 8, wherein the optical amplifier is an optical amplifier system comprising a first optical amplifier and a second optical amplifier, the first optical amplifier configured to amplify the first light beam and the second optical amplifier configured to amplify the second light beam.

10. The optical source of claim 1, wherein the light-generation module further comprises one or more pre-amplifiers, and an optical beam combiner, the optical beam combiner comprising one or more optical elements positioned to interact with one or more of the first and second light beams and the optical beam combiner being configured to direct the first light beam and the second light beam toward the first dichroic optical element of the optical isolator.

11. The optical source of claim 1, wherein
   the plurality of optical elements of the optical isolator comprises a plurality of reflective optical elements, and the plurality of reflective optical elements, the first dichroic optical element, and the second dichroic optical element define the first beam path.

12. The optical source of claim 11, wherein the optical modulator comprises an acousto-optic modulator.

13. The optical source of claim 12, wherein the optical isolator comprises more than one acousto-optic modulator.

14. The optical source of claim 13, wherein a first acousto-optic modulator is on the first beam path, and a second acousto-optic modulator is on a second beam path between the first and second dichroic optical elements, the first and second beam paths being spatially distinct paths in the optical isolator.

15. The optical source of claim 14, wherein the first dichroic optical element is configured to direct the first beam of light onto the first beam path and the second beam of light onto the second beam path.

16. The optical source of claim 15, wherein the second dichroic optical element is configured to direct the first beam of light onto a primary beam path and to direct the second beam of light onto the primary beam path.

17. The optical source of claim 16, wherein the second dichroic optical element is configured to direct a reflection of the first beam of light onto the first beam path and to direct a reflection of the second beam of light onto the second beam path.

18. The optical source of claim 16, wherein to direct the first beam of light onto the primary beam path, the second dichroic optical element transmits the first beam of light onto the primary beam path.

19. The optical source of claim 12, wherein the plurality of optical elements of the optical isolator further comprises a first optical arrangement on the first beam path, wherein the first optical arrangement is between the first dichroic optical element and the acousto-optic modulator, and the first optical arrangement is configured to reduce a beam diameter of the first beam of light.

20. The optical source of claim 19, wherein the plurality of optical elements of the optical isolator further comprises a second optical arrangement on the first beam path, wherein the second optical arrangement is between the second dichroic optical element and the acousto-optic modulator, and the second optical arrangement is configured to enlarge the beam diameter of the first beam of light.

21. The optical source of claim 19, further comprising a polarization-based optical isolator between the optical isolator and the optical amplifier.

22. The optical source of claim 1, wherein the optical modulator comprises one or more of an acousto-optic modulator, an electro-optic modulator, and a Faraday rotator.

23. The optical source of claim 1, wherein the optical modulator comprises an acousto-optic modulator, the acousto-optic modulator being associated with a first state and a second state, the acousto-optic modulator deflecting incident light from an initial beam path in the first state and transmitting incident light onto the initial beam path in the second state, and the optical isolator further comprises a control system configured to provide a trigger signal to the acousto-optic modulator, the acousto-optic modulator being configured to change from one of the first state and the second state to the other of the first state and the second state in response to receiving the trigger signal.

24. An extreme ultraviolet (EUV) optical source comprising:
    optical light generation means for generating a first beam of light and a second beam of light, the first beam of light having a first wavelength, and the second beam of light having a second wavelength, the first and second wavelengths being different;
    optical amplification means for amplifying the first beam of light and the second beam of light to produce, respectively, a first amplified light beam and a second amplified light beam, wherein the first amplified light beam has an energy sufficient to deform target material in a target material droplet into a modified target, the modified target comprising target material in a geometric distribution that is different than a distribution of the target material in the target material droplet, the target material comprising material that emits EUV light when in a plasma state, and the second amplified light beam has an energy sufficient to convert at least some of the target material in the modified target to the plasma that emits EUV light; and
    an optical isolator between the optical light generation means and the optical amplification means, the optical isolator comprising:
        a plurality of dichroic optical elements, the plurality of dichroic optical elements comprising a first dichroic optical element positioned to receive the first light beam and the second light beam from the optical light generation means, and a second dichroic optical element positioned to direct the first light beam and the second light beam toward the optical amplification means,
        a plurality of optical elements on a first beam path between the first dichroic optical element and the second dichroic optical element, the optical elements positioned to interact with light reflected from one or more of the first dichroic optical element and the second dichroic optical element, and
        an optical modulator on the first beam path between the first dichroic optical element and the second dichroic optical element.

* * * * *